United States Patent
Gionta et al.

(10) Patent No.: US 10,435,138 B2
(45) Date of Patent: Oct. 8, 2019

(54) MANUAL WING-FOLD MECHANISM

(71) Applicant: ICON Aircraft, Inc., Vacaville, CA (US)

(72) Inventors: Matthew Gionta, Tehachapi, CA (US); Jon Karkow, Tehachapi, CA (US); Joseph Wilding, Parker, CO (US); Michael Jagemann, Manitowoc, WI (US)

(73) Assignee: ICON AIRCRAFT, INC., Vacaville, CA (US)

( * ) Notice: Subject to any disclaimer, the term of this patent is extended or adjusted under 35 U.S.C. 154(b) by 0 days.

(21) Appl. No.: 16/123,946

(22) Filed: Sep. 6, 2018

(65) Prior Publication Data

US 2018/0370612 A1 Dec. 27, 2018

Related U.S. Application Data

(63) Continuation of application No. 14/335,083, filed on Jul. 18, 2014, now Pat. No. 10,099,770.

(Continued)

(51) Int. Cl.
*B64C 3/56* (2006.01)
*B64C 35/00* (2006.01)
*B64C 3/18* (2006.01)

(52) U.S. Cl.
CPC .............. *B64C 3/56* (2013.01); *B64C 35/008* (2013.01); *B64C 3/185* (2013.01)

(58) Field of Classification Search
CPC ......... B64C 3/56; B64C 35/008; B64C 3/185; B64C 2201/102; B64C 2201/201;

(Continued)

(56) References Cited

U.S. PATENT DOCUMENTS 2,141,534 A * 12/1938 Hudson ..................... B64C 3/56
                                                   244/102 R
2,572,421 A * 10/1951 Abel, Jr. .................... B64C 3/56
                                                    244/49

(Continued)

FOREIGN PATENT DOCUMENTS

DE    3421403 A1    12/1985
GB    5290         11/1914

(Continued)

OTHER PUBLICATIONS

Australian Government, IP Australia Application No. 2014334927; Examination Report No. 1; dated Apr. 7, 2017.

(Continued)

*Primary Examiner* — Christopher P Ellis
(74) *Attorney, Agent, or Firm* — Martensen IP

(57) ABSTRACT

A manual wing-fold mechanism provides a means by which to reconfigure the wing of an aircraft between a flight configuration and one that can be easily stowed and transported. The folding mechanism includes an extension tube that enables the outboard portion of the wing to be extended away from the inboard section of the wing, rotated about the lateral axis of the aircraft and then pivoted rearward so that the wing is aligned with the longitudinal axis of the aircraft along side the fuselage. The wing-fold mechanism is independent of the structural components of the wing used to convey aerodynamic loads during flight and provides a means for the user to bring the outboard wing section into a near alignment position while the wing-fold mechanism thereafter assists to refine the alignment into its final flight configuration.

17 Claims, 17 Drawing Sheets

Related U.S. Application Data

(60) Provisional application No. 61/858,825, filed on Jul. 26, 2013.

(58) Field of Classification Search
CPC .. B64C 37/00; B64C 1/26; B64C 1/30; B64C 2201/028; B64C 2211/00; B64C 5/12; B64C 27/50; B64C 13/28; B64C 19/00; B64C 33/02; B64C 39/068; B64C 3/38; B64C 3/42; B64C 3/44; B64C 3/50; B64C 5/16; B64C 9/02
USPC .......................................................... 244/49
See application file for complete search history.

(56) References Cited

U.S. PATENT DOCUMENTS

| | | | | | |
|---|---|---|---|---|---|
| 2,712,421 | A | * | 7/1955 | Naumann | B64C 3/56 244/49 |
| 3,439,890 | A | * | 4/1969 | Stits | B64C 3/56 244/49 |
| 5,192,037 | A | * | 3/1993 | Moorefield | B64C 3/56 244/3.28 |
| 5,326,049 | A | * | 7/1994 | Rom | F42B 10/14 102/388 |
| 5,372,336 | A | * | 12/1994 | Paez | B64C 3/56 244/49 |
| 5,558,299 | A | * | 9/1996 | Veile | B64C 3/56 244/131 |
| 5,671,899 | A | * | 9/1997 | Nicholas | B64C 3/40 244/3.28 |
| 6,056,237 | A | | 5/2000 | Woodland | |
| 6,089,503 | A | * | 7/2000 | Volk | B64C 3/38 244/35 R |
| 6,742,741 | B1 | * | 6/2004 | Rivoli | B64C 3/40 244/12.1 |
| 7,938,358 | B2 | | 5/2011 | Dietrich et al. | |
| 8,894,004 | B1 | * | 11/2014 | Scott | F42B 10/14 244/3.27 |
| 9,545,991 | B1 | * | 1/2017 | Alley | B64C 3/40 |
| 10,099,770 | B2 | * | 10/2018 | Gionta | B64C 3/56 |
| 10,252,798 | B2 | * | 4/2019 | Petrov | B64C 29/0033 |
| 2010/0230532 | A1 | | 9/2010 | Dietrich | |
| 2011/0180657 | A1 | | 7/2011 | Gionta et al. | |
| 2013/0146716 | A1 | * | 6/2013 | Gettinger | B64C 39/024 244/215 |
| 2014/0061371 | A1 | * | 3/2014 | Good | B64C 3/56 244/49 |
| 2016/0264232 | A1 | * | 9/2016 | Briancourt | B64C 3/56 |
| 2017/0174314 | A1 | * | 6/2017 | Diamante | B64C 3/56 |
| 2017/0369150 | A1 | * | 12/2017 | Finklea | B64C 3/56 |
| 2018/0001992 | A1 | * | 1/2018 | Kracke | B64C 3/56 |
| 2018/0086449 | A1 | * | 3/2018 | Sarigul-Klijn | B64C 31/02 |
| 2019/0031316 | A1 | * | 1/2019 | Hefner | B64C 3/56 |

FOREIGN PATENT DOCUMENTS

| | | | | |
|---|---|---|---|---|
| GB | 461158 | | 2/1937 | |
| GB | 475433 | | 11/1937 | |
| GB | 533900 | A * | 2/1941 | ............... B64C 3/56 |
| GB | 577783 | A * | 5/1946 | ............... B64C 3/56 |

OTHER PUBLICATIONS

Australian Government, IP Australia Application No. 2014334927; Examination Report No. 2; dated Mar. 27, 2018.
The People's Republic of China State Intellectual Property Office; Chinese Application No. 2014800423201; Office Action No. 1; dispatched Nov. 28, 2016.
The People's Republic of China State Intellectual Property Office; Chinese Application No. 2014800423201; Office Action No. 1; dispatched Nov. 28, 2016; English translation of Office Action received from Chinese associate on Jan. 23, 2017.
The People's Republic of China State Intellectual Property Office; Chinese Application No. 2014800423201; Office Action No. 2; dispatched Jul. 13, 2017.
The People's Republic of China State Intellectual Property Office; Chinese Application No. 2014800423201; Office Action No. 2; dispatched Jul. 13, 2017; English translation of Office Action received from Chinese associate on Sep. 5, 2017.
The People's Republic of China State Intellectual Property Office; Chinese Application No. 2014800423201; Office Action No. 3; dispatched Jan. 15, 2018.
The People's Republic of China State Intellectual Property Office; Chinese Application No. 2014800423201; Office Action No. 3; dispatched Jan. 15, 2018; English translation of Office Action received from Chinese associate on Feb. 9, 2018.
The People's Republic of China State Intellectual Property Office; Chinese Application No. 2014800423201; Office Action No. 4; dispatched Jul. 16, 2018.
The People's Republic of China State Intellectual Property Office; Chinese Application No. 2014800423201; Office Action No. 4; dispatched Jul. 16, 2018; English translation of Office Action received from Chinese associate on Jul. 17, 2018.
European Patent Office; EP Application No. 14854050.3; Search Report dated Feb. 23, 2017.
European Patent Office; EP Application No. 14854050.3; Examination Report dated Feb. 2, 2018.
Patent Cooperation Treaty; International Searching Authority; Application No. PCTUS/ 14/47433; Notification of Transmittal of the International Search Report and the Written Opinion of the International Searching Authority; dated Mar. 18, 2015.
Russian Patent Office; Russian Application No. 2016102195; Office Action dated Jun. 21, 2018.
Russian Patent Office; Russian Application No. 2016102195; Office Action dated Jun. 21, 2018; English translation of Office Action received from Russian associate on Aug. 8, 2018.
European Patent Office; EP Application No. 18201979.4; Extended European Search Report and Search Opinion; dated Jan. 9, 2019.

* cited by examiner

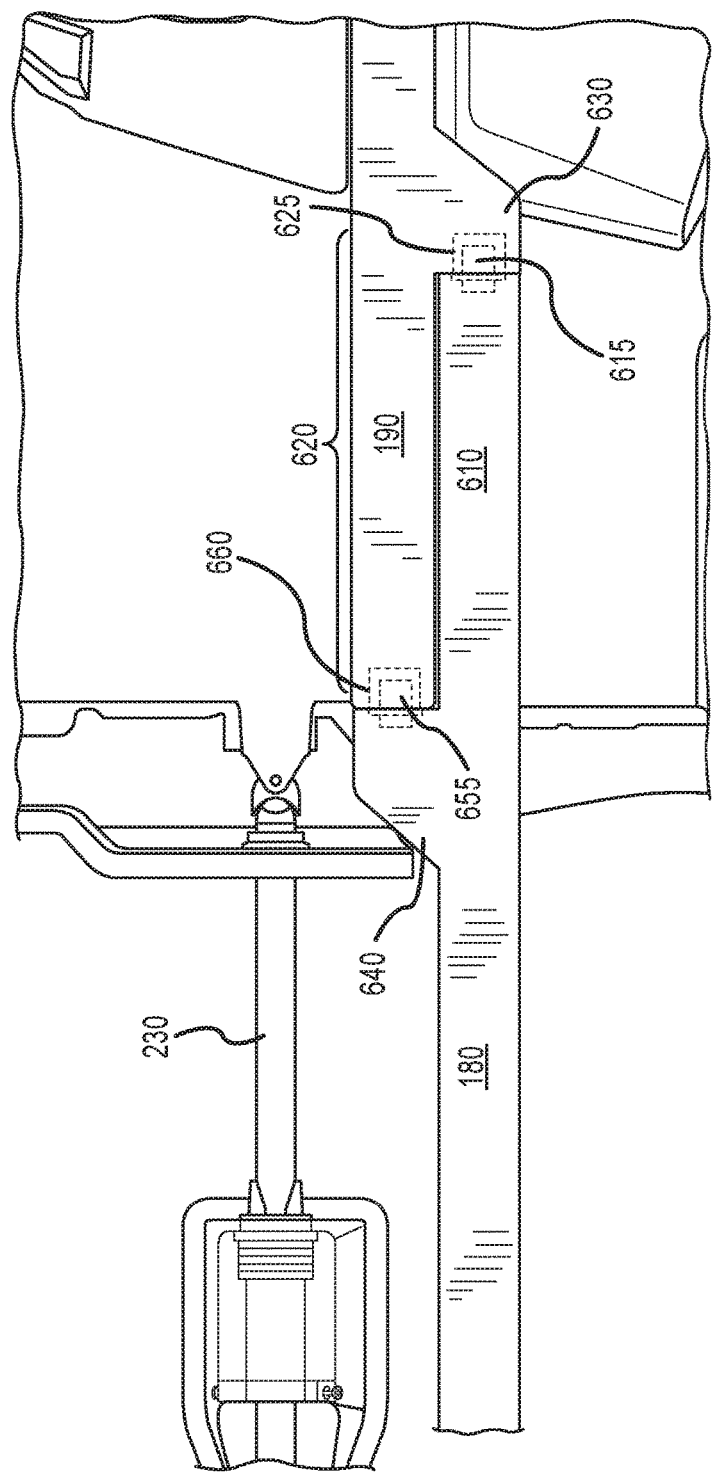

MANUAL WING-FOLD MECHANISM

RELATED APPLICATION

The present application is a continuation of, relates to, and claims the benefit of priority to U.S. patent application Ser. No. 14/335,083 filed Jul. 18, 2014, which claims benefit of priority to U.S. Provisional Patent Application Ser. No. 61/858,825 filed Jul. 26, 2013, which are hereby incorporated by reference in their entirety for all purposes as if fully set forth herein.

BACKGROUND OF THE INVENTION

Field of the Invention

Embodiments of the present invention relate, in general, to a manual mechanism to fold a wing on an aircraft and more particularly to a manual wing-fold mechanism having independent load paths for flight loads and loads supporting the wing during the folding operation.

Relevant Background

Despite the technological advances in aviation, one only has to spend some time observing nature to recognize that many challenges with respect to aviation still lie before us. It has long been recognized that aircraft are difficult to house on the ground. They are by their very nature, awkward large crafts. The gangly wings and fuselage require a large space by which to cover and protect the craft from the elements. And as agile as an aircraft may be once airborne, its movement on the ground is one of lumbering cautiousness.

Yet a bird, as it smoothly transitions from flight to rest on a dowel, can quickly and efficiently fold its wings and squeeze through a hole not much larger than the size of its head. So it is not surprising that an efficient and timely means for stowing an aircraft's wings to aid in transportation and storage is a long felt need.

Several approaches for folding the wings of an aircraft to reduce its overall size have been developed. Many modern-day aircraft, especially military aircraft, are equipped with wing sections that can be folded or placed into a position that when not deployed for flight operations offers the ability for the aircraft to be stored and transported in a much more efficient manner. Examples of such aircraft include carrier-based aircraft in which the wings fold for compact storage and maintenance below deck. Other examples include sailplanes, which upon landing in locations away for their normal base of operations possess the ability to remove the wings so that the aircraft can be quickly loaded on a trailer for transportation.

In aircraft in which the wings fold but remain attached to the fuselage, the mechanisms must securely lock the wings in the deployed position for flying and also secure the wings in their folded position so that they are not inadvertently damaged from wind gusts or the like. As the wings are substantial components of the aircraft, they represent a significant amount of mass and are designed to translate aerodynamic loads from the wingtip to the wing root. These loads are conveyed via one or more spars that run along the length of the wing parallel to the lateral or pitch axis of the aircraft.

Typically, a folding mechanism utilizes these same large structural components, spars, to support the folding and/or rotation of the wing. While seemingly an efficient use of the wing's inherent structure, the complexity and necessary robustness of such a mechanism comes at the cost of weight. In large military aircraft this additional complexity and added weight is minimal in comparison to other design criteria, such as the structural requirements for landing on a carrier or for carrying external ordinance. However, in light recreational or utility aircraft, the weight and complexity of such a folding mechanism is unacceptable.

The most efficient use of space in which to store the wings is to align the wings in some manner with the fuselage. Generally such a mechanism uses a single motion to pivot the wings through an axis oblique to the fuselage. The Grumman Corporation carrier based aircraft use this type of wing-fold. A single motion fold, however, possesses some undesirable characteristics. For example, such a fold mechanism requires a section of the upper and lower wing surface to be removed or repositioned so that the folding portion does not intersect with the stationary portion. Single motion folds also create center of gravity concerns making the aircraft unstable during ground operations.

Therefore, what is needed is a wing-fold mechanism that is simple, robust and lightweight. Moreover, it is desirable that the folding mechanism be separate from the inherent structure of the wing that transfers aerodynamic loads from the wingtip to the wing root and that it be a manual process operable by a single individual. These and other challenges of the prior art are addressed by one or more embodiment of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A manual wing-fold mechanism and associated methodology enables a single user to disconnect, extend, rotated and pivot the outboard section of a wing to a storable and transportable position along side the fuselage of the aircraft. One embodiment of the wing fold mechanism of the present invention includes a wing having a first wing section associated with a wing tip and a first wing section spar, and a second wing section associated with a wing root and a second wing section spar, wherein the wing in flight configuration is associated with a lateral axis spanning from the wingtip to the root. The mechanism further includes a plurality of shear pins operable to couple the first wing section spar to the second wing section spar wherein the plurality of shear pins are substantially parallel to the lateral axis. Moreover, the wing-fold mechanism includes a folding apparatus coupling the first wing section and the second wing section wherein the folding apparatus is operable to extend the first wing section from the second wing section along the lateral axis, rotate the first wing about the lateral axis and pivot the first wing section about a vertical axis perpendicular to the lateral axis placing the first wing section spar substantially perpendicular to the second wing section spar and aligned with the fuselage.

Some additional features of the invention include that the transfer of aerodynamic loads is independent of the folding apparatus. In addition, when the wing is in flight configuration, a portion of the first wing spar overlaps with a portion of the second wing section spar. Shear pins that couple the outboard wing section to the inboard wing section are operable to transfer in-flight aerodynamic loads from the first wing section to the second wing section. In one embodiment of the present invention, the shear pins are associated with the outboard portion of the wing, while the sockets that receive the shear pins are associated with the inboard section of the wing. The shear pins also each include a first diameter and a second diameter, wherein a shear load is distributed among the first diameter and the second diameter as it transfers aerodynamic forces from one wing section to the other.

According to another embodiment of the present invention, a foldable aircraft wing includes a first wing section having a first wing spar, a second wing section having a second wing spar, and an extension device pivotally coupling the first wing section to the second wing section.

When the wing is in a flight configuration, the first wing spar is coupled to the second wing spar forming a wing spar juncture operable to transfer aerodynamic loads between the first wing section and the second wing section. When the first wing spar decouples from the second wing spar the extension device is operable to extend the first wing section apart from the second wing section along a lateral axis substantially parallel with the first wing spar, rotate the first wing section about the lateral axis, and pivot at a pivot point associated with the second wing section, to a transportable configuration.

In yet another embodiment of the present invention, a system for modifying a wing from a transportable configuration to a flight configuration includes a first wing spar associated with a first wing section wherein the first wing section in the transportable configuration is substantially orthogonal to a second wing section, and a second wing spar associated with the second wing section wherein the first wing spar is attachable to the second wing spar at a wing spar juncture.

The system also includes a folding device, independent of the first wing spar and the second wing spar, that couples the first wing section to the second wing section and is operable to position the first wing section from the transportable configuration to the flight configuration so as to associate the first wing spar with the second wing spar at the wing spar juncture Finally, the foldable aircraft wing includes a plurality of shear pins that couple the first wing spar to the second wing spar. Each of the shear pins includes a first pin diameter and a second pin diameter and wherein a shear load between the two wing sections is distributed between the first pin diameter and the second pin diameter.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 6B is a top view of the wing spar juncture and wing-fold mechanism according to one embodiment of the present invention;

Figure 1:
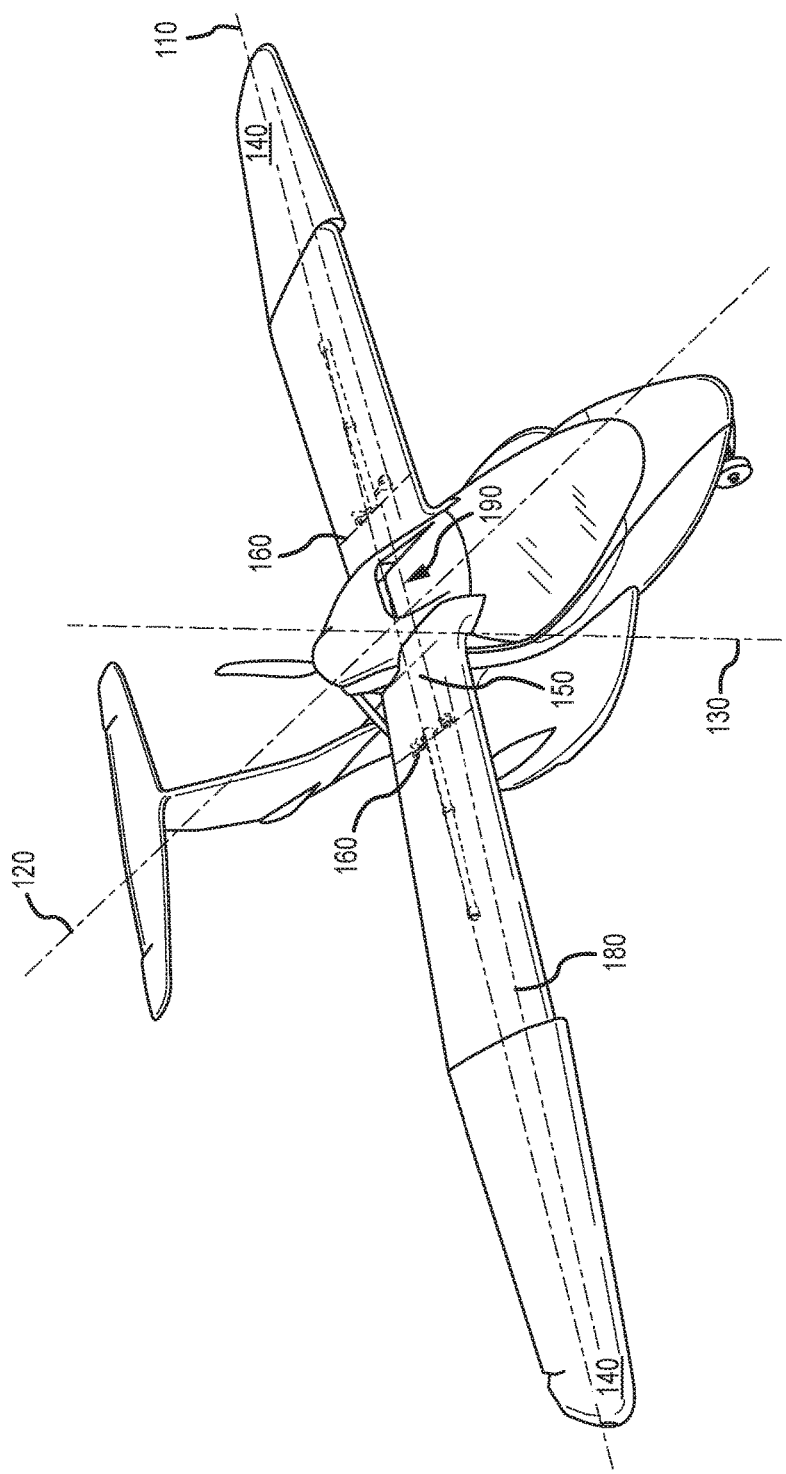
FIG. 1 is a front perspective view of an aircraft equipped with a manual wing-fold mechanism of the present invention wherein the wing is in a flight configuration.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Described hereafter by way of example, is a manual wing-fold mechanism that decouples an outboard wing section from an inboard wing section and repositions the outboard wing section so as to be substantially aligned with the longitudinal axis of the aircraft (fuselage) for storage and transportation. The wing-fold mechanism of the present invention is independent of the primary spar structure within the wing used to transfer aerodynamic loads between the wingtip and the wing root. According to one embodiment of the present invention, a first wing spar, associated with the outboard section of the wing and, a second wing spar, associated with the inner portion of the wing, overlap when placed into a flight configuration. Shear pins join the first wing spar to the second wing spar forming a functionally singular wing spar along the entire span of the wing.

Upon electing to reconfigure the wing to its folded configuration, locking pins securing the placement of the shear pins within their sockets are removed, freeing the first wing section (outboard) from the second wing section (inboard). The outboard wing section is extended away from the inboard wing section along the lateral axis of the aircraft upon a single extension tube. Upon full displacement, the extension tube serves as the sole point of interaction between the outboard section and the inboard section. The outboard wing section is thereafter rotated about the lateral axis until outboard wing section is substantially perpendicular to the inboard wing section. Next, the rotated outboard wing section is pivoted rearward about a pivot point at the juncture between the extension tube and inboard wing section. Once the outboard wing is folded rearward so as to be substantially aligned with, and parallel to, the longitudinal axis of the aircraft, the outboard wing section is repositioned forward along the longitudinal axis contracting the extension tube and placing the outboard wing section into close proximity with the inboard wing section for transport. In this position the outbound wing section is secured for storage and/or transportation.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A wing "Spar" is often the main structural member of the wing, running spanwise at right angles (or thereabouts depending on wing sweep) to the fuselage. The spar carries flight loads when airborne and the weight of the wings while on the ground. Other structural and forming members such as ribs (see below) may be attached to the spar or spars, with stressed skin construction also sharing the loads where it is used. Where a single spar carries the majority of the forces on it, it is known as the main spar.

An aircraft "Rib' is a forming elements of the structure of a wing, especially in traditional construction. By analogy, the ribs attach to the main spar, and by being repeated at frequent intervals, form a skeletal shape for the wing. Usually ribs incorporate the airfoil shape of the wing, and the skin adopts this shape when stretched over the ribs.

The "Leading Edge" is the part of the wing that first contacts the air and is typically the foremost edge of an airfoil section. As an example of the distinction, during a tailslide, from an aerodynamic point of view, the trailing edge becomes the leading edge and vice-versa but from a structural point of view the leading edge remains unchanged.

The "Trailing Edge" of an aerodynamic surface is its rear edge, where the airflow separated by the leading edge rejoins. Essential control surfaces are attached to the trailing edge to redirect the airflow and exert a controlling force by changing its momentum. Such control surfaces include ailerons on the wings for roll control, elevators on the tailplane controlling pitch and the rudder on the tail to control yaw.

The "Wing Root is the part of the wing on a fixed-wing aircraft that is closest to the fuselage. By analogy the Wing Tip" is the part of the wing that is most distant from the fuselage of a fixed-wing aircraft.

In the figures that follow, like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Also included in the description are flowcharts depicting examples of the methodology that may be used to fold a wing of an aircraft using the manual wing-fold mechanism of the present invention. In the following description, it will be understood that each block of the flowchart illustrations, and combinations of blocks in the flowchart illustrations, can be implemented a variety of ways.

Accordingly, blocks of the flowchart illustrations support combinations of means for performing a specified function and combinations of steps for performing specified function. It will also be understood that each block of the flowchart illustrations, and combinations of blocks in the flowchart illustrations, can be implemented by special purpose hardware systems that perform the specified functions or steps, or combinations of special purpose hardware and instructions.

Upon reading this disclosure, those of skill in the art will appreciate still additional alternative structural and functional designs for a manual wing-fold mechanism and a process for manually folding a wing through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

An understanding of the inventive material disclosed herein can be gained with reference to the included Figures including FIG. 1. FIG. 1 through FIG. 5 presents temporal renditions of the manual wing-fold mechanism of the present invention as it is used to fold a wing from its flight configuration to one for storage and/or transportation. FIG. 1 is a right front elevated perspective view of an aircraft that includes a manual wing-fold mechanism of the present invention. In the configuration shown in FIG. 1, the wing is in its flight configuration.

The aircraft shown in FIG. 1, and for the purposes of this discussion, includes three primarily axis for orientation. They include the lateral or pitch axis 110, the longitudinal or roll axis 120 and the vertical or yaw axis 130. The aircraft depicted in FIG. 1 includes a wing configured for flight operations that extends from wingtip 140 to wing root 150. According to one embodiment of the present invention, the wing is divided at a juncture point 160. Outboard of the juncture point 160 is the outboard or first wing section associated with the wing tip 140. Inboard of the juncture point 160 is the inboard or second wing section and is associated with the wing root 150. As with most wings in an aircraft, the wing comprises a plurality of ribs and spars. The spars run parallel to the lateral (pitch) axis 110 while the ribs run parallel to the longitudinal (roll) axis 120. The main wing spar is typically responsible for the transfer of aerodynamic loads along the lateral axis 110. According to one embodiment of the present invention the first wing section includes a first wing section spar 180, and the second wing section includes a second wing section spar 190. The first wing section spar 180 and the second wing section spar 190 begin to overlap at the juncture 160 and are coupled by a plurality of shear pins (not shown). In other embodiments, the aircraft wing may posses two or more main wing spars and they may or may not overlap.

Figure 2:
FIG. 2 is a front perspective view of an aircraft equipped with a manual wing-fold mechanism of the present invention in which the outboard wing section has been extended.

FIG. 2 is a right front elevated perspective view of an aircraft having a manual wing-fold mechanism of the present invention in which the first wing section is in its extended position. As shown in FIG. 2 the first wing section 210 extends outboard along the lateral axis 110 from the longitudinal and vertical axis and away from the second wing section 220. The second wing section 220 remains affixed to the fuselage.

Significantly and according to one embodiment of the present invention, the first wing section spar 180 separates and becomes apart from the second wing section spar 190. As is apparent in FIG. 2, when the first wing section is in a flight configuration and not extended, the first wing section spar 180 and the second wing section spar 190 overlap. As the first wing section 210 is pulled away from the second wing section 220 by a user the continuity of the main wing spar is broken and can no longer be used to convey loads including the structural weight of the first wing section. Thus as the first wing section 210 is extended an extension tube 230 acts as the sole coupling between the first wing section 210 and the second wing section 220. Said differently, the folding mechanism of the present invention is independent of the structural members of the wing that support and transfer aerodynamic loads.

Figure 3:
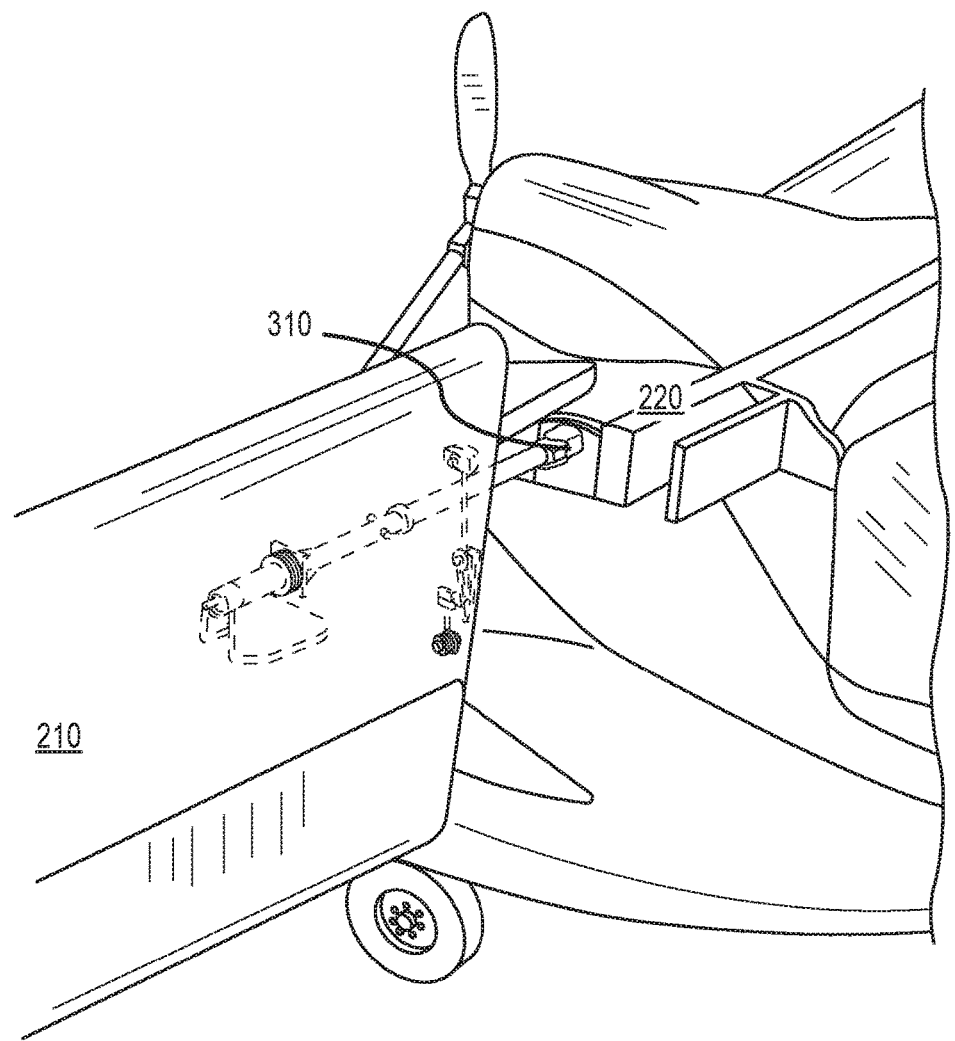
FIG. 3 is a front perspective view of an aircraft equipped with a manual wing-fold mechanism of the present invention in which the outboard wing section is extended and rotated 90 degrees.

Turning attention in addition to FIG. 3, another right front elevated perspective view of the aircraft with the manual wing-fold mechanism of the present invention can be seen. In this temporal depiction, the extended first wing section 210 is extended and rotated approximately 90 degrees counterclockwise. One of reasonable skill in the relevant art will appreciate that the current drawings depict the starboard or right wing and the motions discussed herein would be mirror by the port of left wing. At this point the first wing section 210 is supported by user, presumably at the wing tip, holding and manipulating the wing, and by the extension tube 230 at the second wing section juncture 160. The extension tube 230, in this embodiment of the present invention, extends from and is housed within the first wing section 210 and is pivotally joined to the second wing section 220 at a pivot point 310. In another embodiment of the present invention, the extension tube can be housed within the second wing section 220 or a combination thereof.

Figure 4:
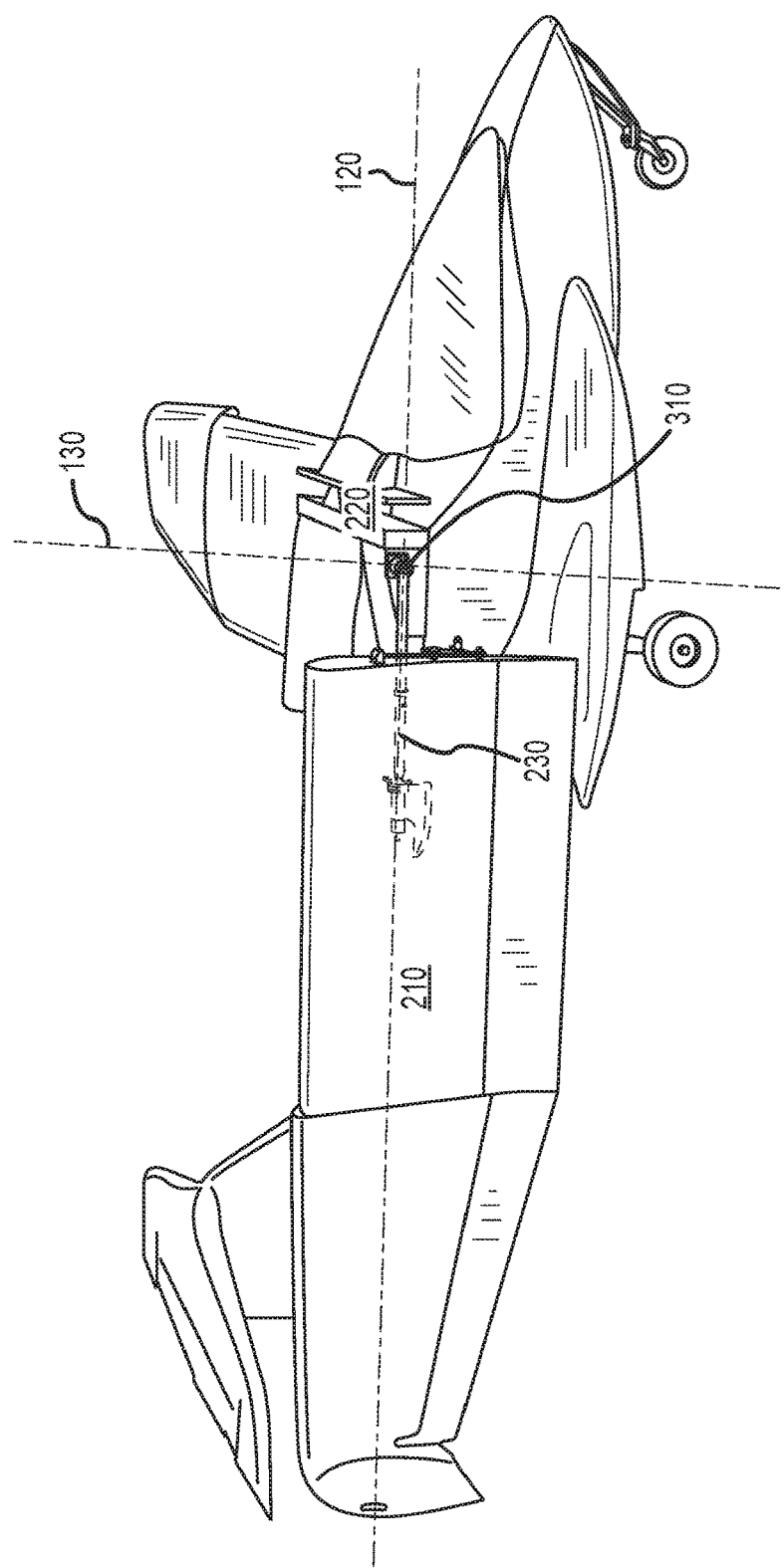
FIG. 4 is a side perspective view of an aircraft equipped with a manual wing-fold mechanism of the present invention in which the outboard section of the wing has been folded back and is aligned with the fuselage of the aircraft.
Figure 5:
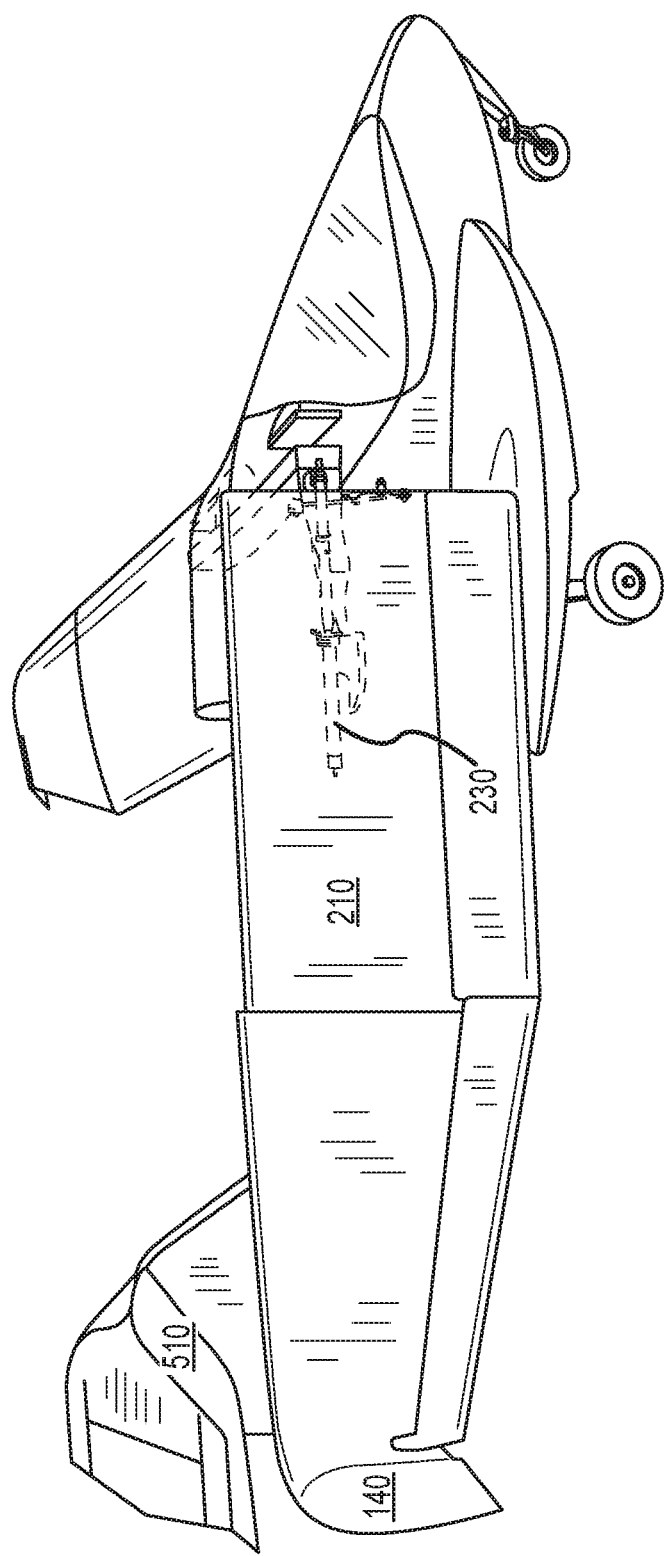
FIG. 5 is a side perspective view of an aircraft equipped with a manual wing-fold mechanism of the present invention in which the outboard section of the wing has been folded back, aligned with the fuselage of the aircraft, and positioned forward for storage and transportation.

FIG. 4 is a side perspective view of an aircraft with one embodiment of a wing-fold mechanism of the present invention. In this view the first wing section has been folded rearward at the pivot point 310. The wing is rotated about the vertical axis and aligned with the fuselage so as to be parallel with the longitudinal axis. In one embodiment of the present invention, the first wing section 210 remains extended along the axis of the extension tube 230. To relieve stress on the extension tube and to make the aircraft more compact and stable for transport, the first wing section 210 is translated forward along the longitudinal axis as depicted in FIG. 5. As shown, the extension tube 230 in this embodiment is fully housed within the first wing section 210 and, as discussed hereafter, secured from further rotation. Another feature of the present invention is that the wing in its folded and stowed position can be coupled at the wing tip 140 to the horizontal stabilizer 510. This releases or reduces any additional stress that the extension tubes and/or pivot point may experience while the first wing section is in the stowed configuration.

The process for restoring the wing to a flight configuration from its stowed configuration is merely the reverse process of that described above. The first wing section is uncoupled from the horizontal tail and extended rearward until the extension tube is at a point of full travel. A user at the wing tip rotates the wing laterally about the vertical axis until the first wing section is parallel with the lateral axis, albeit still vertically oriented. The first wing section is then rotated about the lateral axis while fully extended so as to align the first wing section spar with the second wing section spar. Thereafter the first wing section is pushed together with the second wing section until the first wing section spar joins with the second wing section spar forming a main wing spar and placing the wing into a flight configuration.

The juncture of the first wing section with the second wing section and joining of the first wing spar with the second wing spar is a critical step in a wing-fold operation. The wing supports the fuselage during flight and the forces generated and experienced by the wing are conveyed to the fuselage by the spar. Thus, the joining of the first wing section spar with that of the second wing section spar must be exact, consistent and reliable.

Figure 6A:
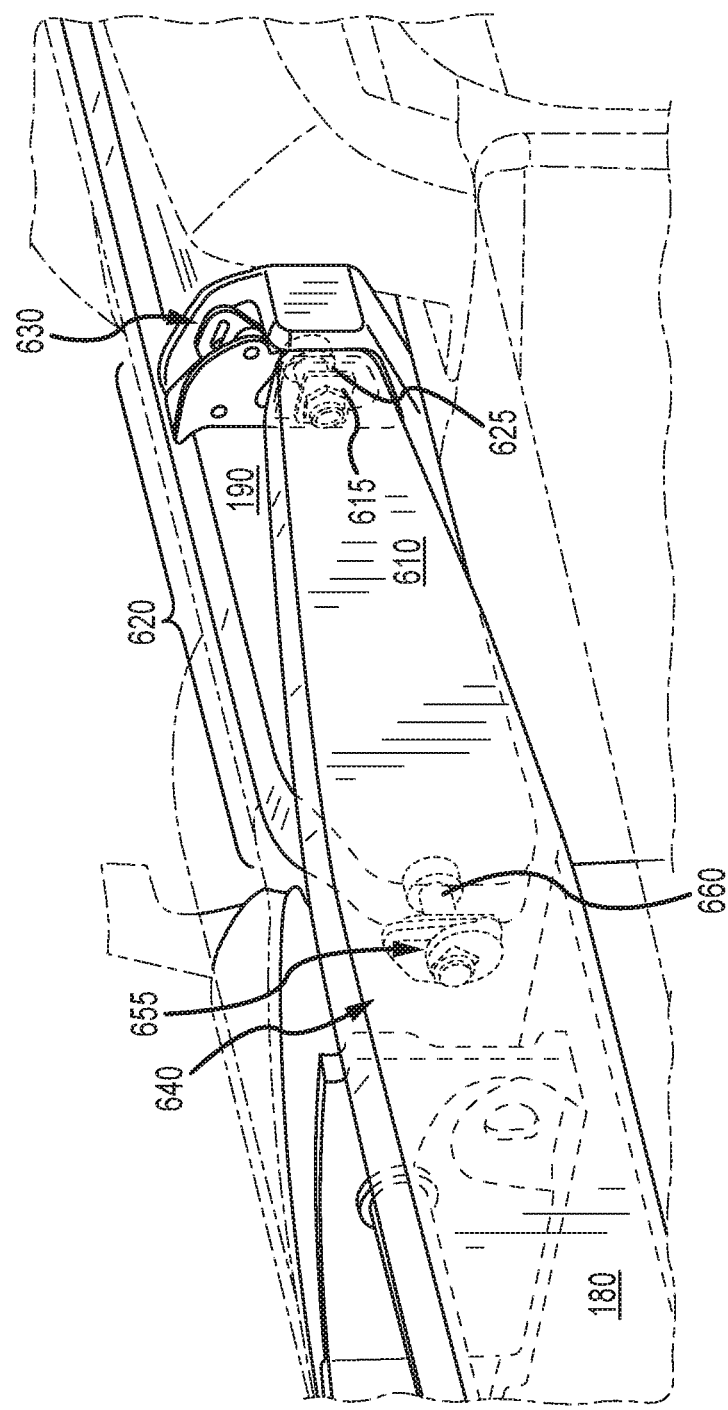
FIG. 6A is a cut away perspective view the juncture of the outboard and inboard wing spar as associated with the manual wing-fold mechanism of the present invention.

FIGS. 6A and 6B show an expanded view of the juncture between the first wing section and the second wing section and specifically the joining of the first wing spar and the second wing spar. According to one embodiment of the present invention, and as shown in FIG. 6A, the first wing section spar 180 incudes a joining section 610 that, when in the flight configuration, overlaps 620 with the second wing section spar 190. The distal end of the joining section 610 includes a first shear pin 615 that fits into a first shear pin receptacle or socket 625 located in a second wing section spar bulkhead 630 that is associated with the second wing section spar 190. Similarly, the second first wing section spar 180 possesses a first wing section bulkhead 640 having a second shear pin socket that accepts a second shear pin 655 associated with the second wing spar 190

Turning to the top view of the wing shown in FIG. 6B, the overlap between the second wing section spar 190 and the joining section 610 of the first wing section spar 180 can be readily seen. The bulkhead of the second wing section 630 is offset from the second wing section spar 190 so as to align with the first shear pin 615 and the bulkhead of the first wing section 640 is offset from the first wing section spar 180 to align with the second shear pin 655.

According to one embodiment of the present invention, the first and second shear pins are parallel with the lateral axis 110 and perpendicular with the longitudinal axis 120. Accordingly, as the first wing section moves into a flight configuration with the second wing section, the first and second shear pins engage the respective spar bulkheads and shear pin receptacles automatically. Using the configuration of the present invention it is not necessary to maintain the position of the first wing section with respect to the second wing section as separate shear pins are inserted. Rather, the mere placing of the first wing section into a flight configuration with the second wing section engages the shear pins forming a cohesive main wing spar.

As aerodynamic loads are transferred from the first wing section spar 180 to the second wing section spar 190 the offset configuration of the juncture will create a twisting moment. To address this twist or torque, a third shear pin is positioned near the trailing edge of the wing at the juncture between the first wing section and the second wing section.

Figure 7:
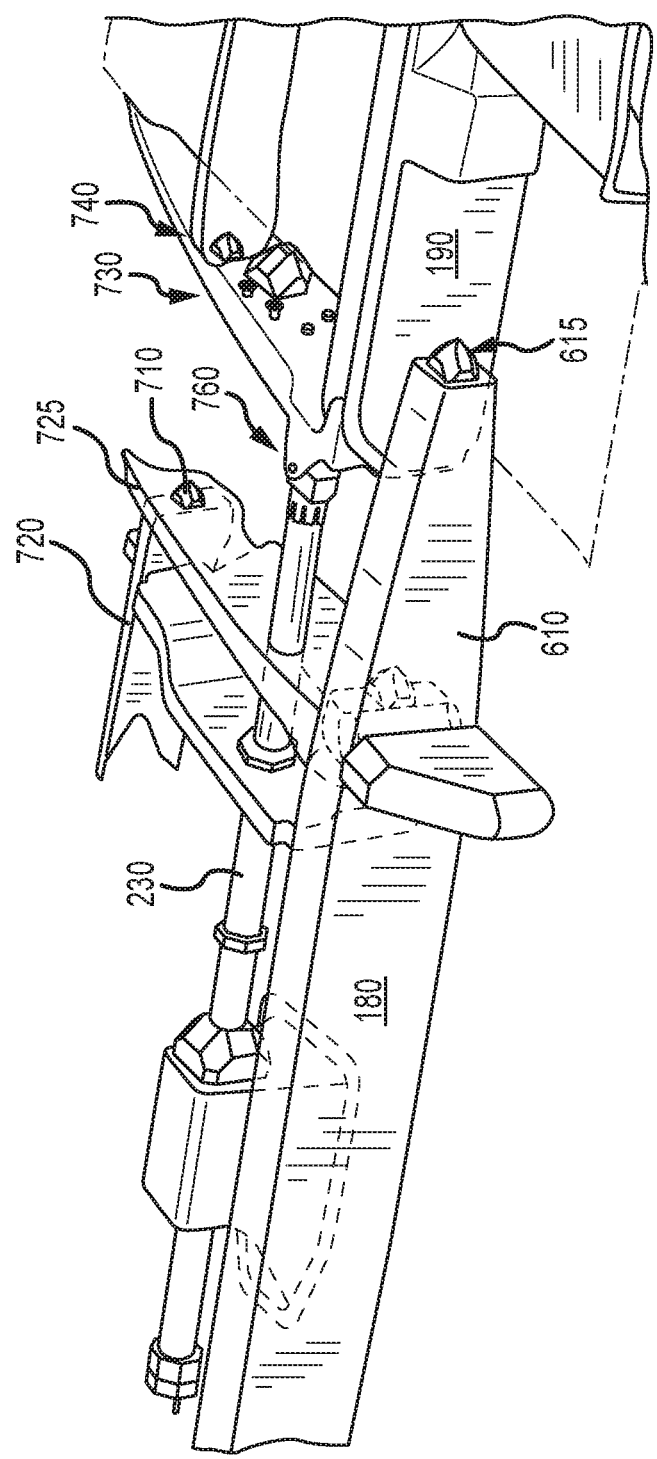
FIG. 7 is a front right perspective cut away view of one embodiment of the wing-fold mechanism of the present invention in which the outboard wing is in an extended position.

FIG. 7 is an upper right perspective view of an extended wing having a manual wing-fold mechanism of the present invention. This view of the juncture between the first wing section 210 and the second wing section 220 highlights the overlap of the first wing section spar 180 and the second wing section spar 190. It further shows the presence of a third shear pin 710 located on a secondary spar 720. Just as with the first shear pin 615 and the second shear pin (not shown), the third shear pin 710 engages a third shear pin receptacle 740 associated with the second wing section 220. As aerodynamic loads are transferred from the first wing section 210 to the second wing section 220 via the spar juncture, the resulting twisting moment is addressed by the presence of the third shear pin 710.

FIG. 7 further illustrates a first wing section rib 725 that acts to terminate the first wing section 210 and a second wing section rib 730 that terminates the second wing section 220. Also associated with the second wing section 220 and the second wing section rib 730 is a pivot joint 760 that directly couples the extension tube 230 between the first wing section 210 and the second wing section 220. The pivot joint 760 is a single point of contact between the extension tube 230 and the second wing section rib 740. The joint 760 enables the first wing section 210 to rotate about the lateral axis (longitudinal axis of the extension tube 230) and rotate about an axis parallel with the yaw axis of the aircraft. Alternatively, the pivot joint may be limited to enable the extension tube to pivot about the yaw axis while the first wing section 210 is operable to rotate about the longitudinal axis of the extension tube 230 at a point where it engages the extension tube.

Figure 8:
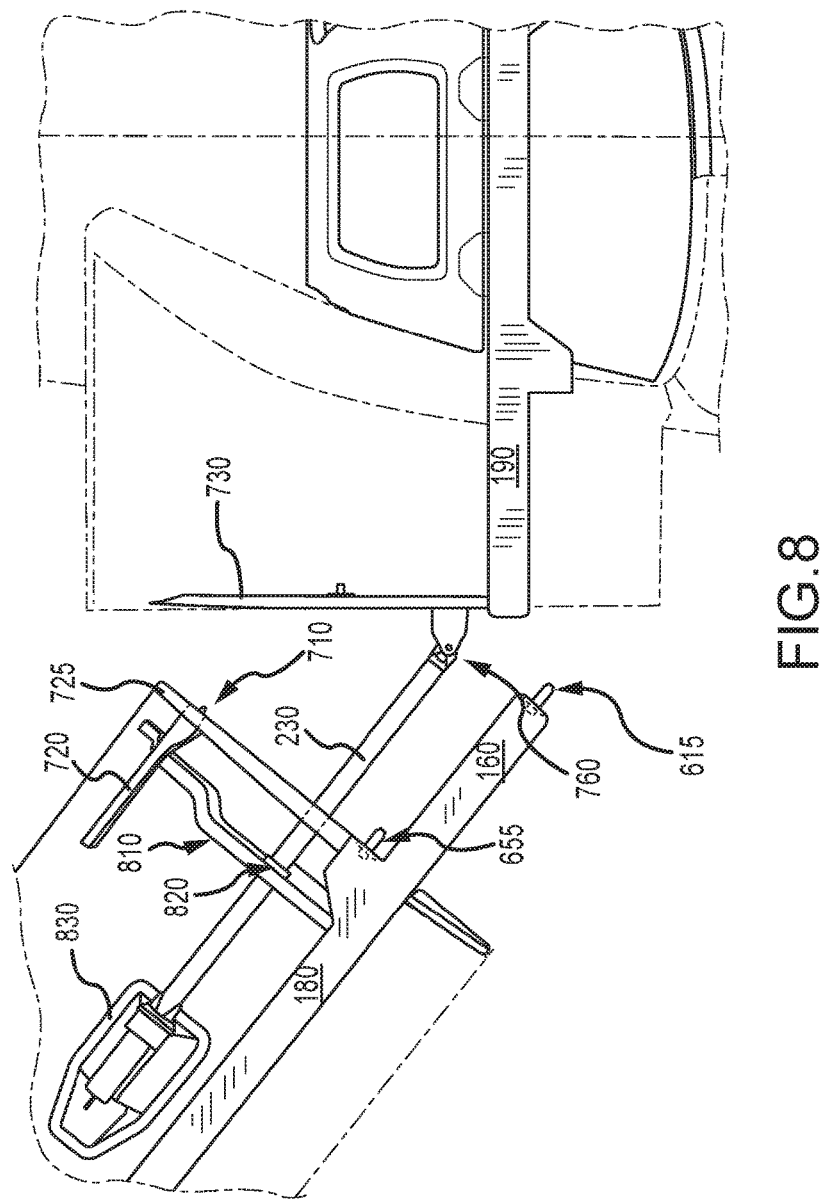
FIG. 8 is a top view of one embodiment of the wing-fold mechanism of the present invention in which the outbound wing is in an extended and partially folded configuration.

FIG. 8 shows a top view of the manual wing-fold mechanism of the present invention in which the first wing section is canted rearward at approximately 45 degrees for illustrative purposes. The reader will note that while this depiction of the first wing section 210 with respect to the second wing section 220 is illustrative of their relationship and that of the wing-fold mechanism of the present invention, in operation of the invention, this particular orientation of the first wing section 210 with respect to the second wing section 220 is not contemplated.

FIG. 8 presents a context of the placement and configuration of the extension tube 230 and the extension tube housing 830. As previously described, the extension tube 230 is coupled to the second wing section 220, or more precisely the second wing section rib 730 at the pivot joint 760. The extension tube thereafter traverses the first wing section rib 725 and through a support structure 810 and thereafter terminates in the extension tube housing 830. The support structure 810 includes, in this embodiment of the present invention, a floating bearing 820. The floating bearing supports the extension tube 230 as it translates from the housing 830 and provides some lateral and vertical flexibility with respect to the alignment of the first wing section 210 and thus the shear pins as they become proximate to the shear pin receptacles associated with the second wing section 220.

Figure 9:
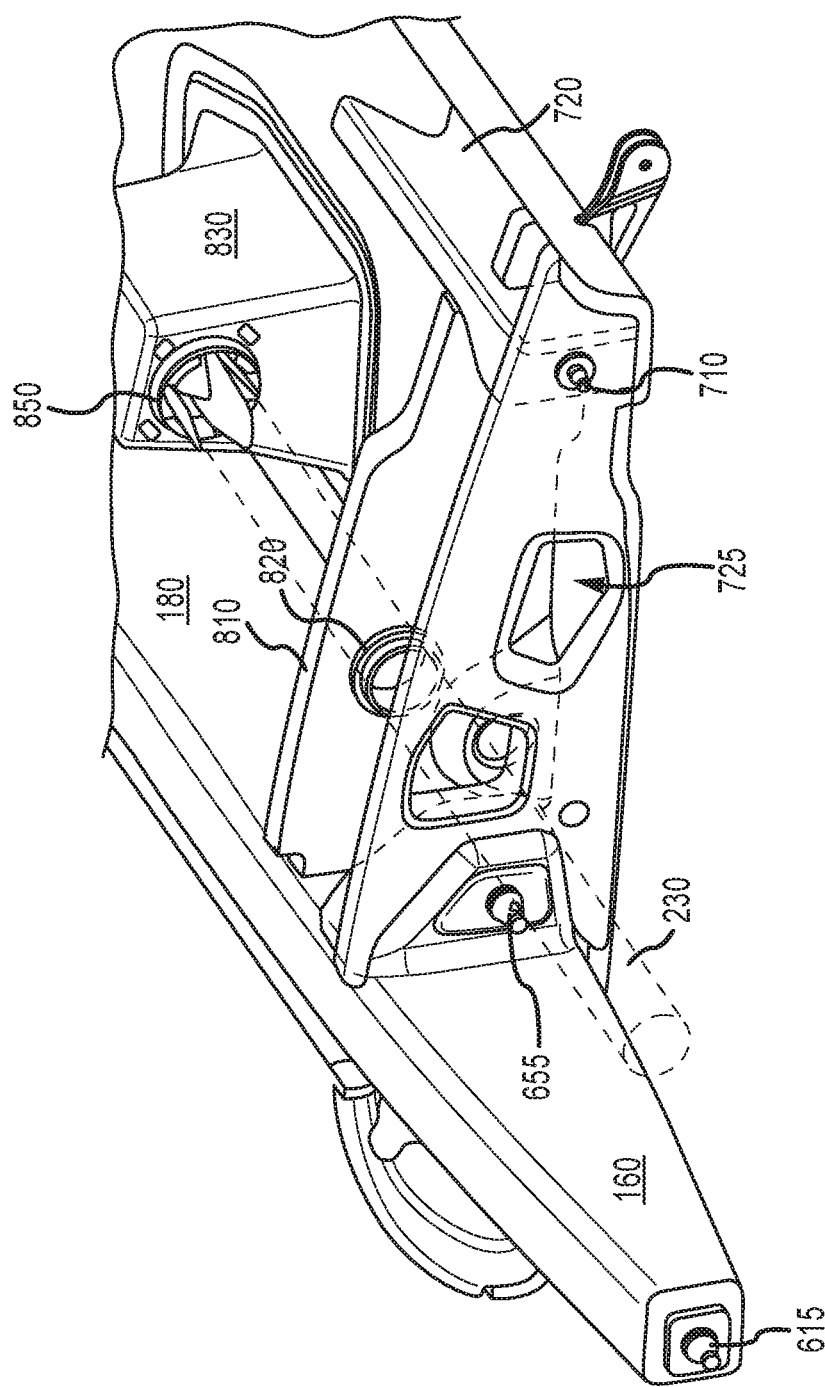
FIG. 9 is an rear side perspective view of outboard portion of the wing and wing-fold mechanism according to one embodiment of the present invention.

Turning attention to FIG. 9, one can find a detailed cut away view of the first wing section but from a rear upward perspective vantage point. This view of the first wing section 210 provides a clear view of the three-shear pin 615, 655, 710 configuration that conveys aerodynamic loads from the first wing section spar 180 to the second wing section spar 190. Slightly aft from the first wing section spar 180 is the extension tube 230 and the extension tube housing 830. The extension tube housing is secured to the first wing section 210 and is operable to permit the extension tube 230 to traverse the housing 210 while providing structural support. When the first wing section 210 is coupled to the second wing section 220 and in a flight configuration, the extension tube 230 traverses the extension tube housing 830 and resides within the first wing section 210. As the first wing section 210 is extended along the lateral axis 110 of the aircraft and apart from the second wing section 220, the extension tube 230 traverses the housing 830 until it reaches a stop or limit within the housing 830. The extension tube 230 travels through, and is encircled by a floating bearing 820 that is associated with a secondary support structure 810 before terminating at the pivot joint 760 adjacent to the second wing section 220.

According to one embodiment of the present invention, the extension tube-housing 830 includes an alignment guide 850 that assists in the alignment of the first wing section 210, as is approaches juncture with the second wing section 220. As one reasonable skill in the relevant art will appreciate, the alignment and interaction of the shear pins within the shear pin receptacles is a fundamental step in the manual wing-fold process. As the first wing section approaches the second wing section, the shear pins must fit securely within their respect shear pin receptacle. If the shear pins are misaligned it could potentially damage the receptacle or the pin itself, which could alter performance and load transfer characteristics.

As the first wing section approaches the second wing section, the extension tube travels within the extension tube housing 830 until the wing sections meet. As this is a manual system, there is a large variability with respect to the accuracy and consistency of this joining process. Yet all three shear pins must be securely seated within their respective receptacle or socket to ensure that aerodynamic loads are properly transferred from the first wing section spar to the second wing section spar. Thus an alignment guide 850 acts to assist the user in properly seating the shear pins in their respect socket.

The alignment guide 850 interacts with the extension tube 230 as the wing sections approach each other to refine their orientation and to bring the shear pins into contact with their respective sockets. According to one embodiment of the present invention, the alignment guide is comprised of a plurality of narrowing channels that accept one or more pins that extend from the extension tube. As the extension tube 230 travels through the extension tube housing 830 and through the alignment guide 850 the pins are funneled into the narrowing channel. The pins are positioned on the extension tube and the channels configured on the alignment guide so as to match the alignment of the shear pins with the shear pin sockets. By doing so the first wing section can be manually brought close to the second wing section with some degree of variance. As the distance between the first wing section and the second wing section close, the pins on the extension tube fall within the channels of the alignment guide. As the distance continues to be decreased, the pins and the alignment guide interact to refine the orientation of the first wing section with respect to the second wing section so as to align the shear pins with the respective shear pin sockets.

In another embodiment of the present invention, the alignment guide assists in securing the first wing section for storage and transport. Recall that after the first wing section is rotated along the lateral axis and then folded rearward about the vertical axis, the first wing section is still extended along the extension tube. Once folded rearward, the wing is then pushed forward to its resting/stowed position. Again the extension tube is received within the first wing section and by the extension tube housing. As the first wing section is positioned into its stowed position, the alignment guide again interacts with pins positioned on the extension tube. This time the pins are not serving to place the first wing section into a precise degree of alignment but rather providing a means by which to support and secure the wing as it rests alongside the fuselage.

As previously mentioned, the first wing section is joined to the second wing section, according to one embodiment, via three shear pins. One skilled in the relevant art will appreciate other configurations and numbers of pins can be used to couple the first wing section to the second wing section without departing from the scope of the present invention. According to one embodiment of the present invention, the joining of the first wing section to the second wing section occurs concurrently with the insertion of the load bearing shear pins into their sockets. To accomplish this, the shear pins are parallel with the lateral axis of the aircraft rather than being parallel with the longitudinal axis of the aircraft as with most designs of the prior art. Moreover most designs of the prior art include a two-step process. That process normally includes bringing the wing spars into alignment forming a juncture and thereafter inserting shear pins to affect transference of loads. In the present invention these two steps are combined.

As the first wing section is placed into close proximity with the second wing section to achieve a flight configuration, each of the shear pins must align with and be inserted into their respective socket. As described above, the alignment guide associated with the extension tube directs the two wing sections together with some degree or precision. As one of reasonable skill in the relevant art will appreciate, the fit between the shear pin and socket must be sufficiently tight so to prevent needless play and any resulting damage to the fitting that may occur after repeated load cycles. A refining process of aligning the spars and then inserting the appropriate pins enables the alignment of the spars to be refined and confirmed prior to the insertion of the pins. The present invention addresses that issue with not only the extension tube guide but also a multi tiered shear pin design.

Figure 10:
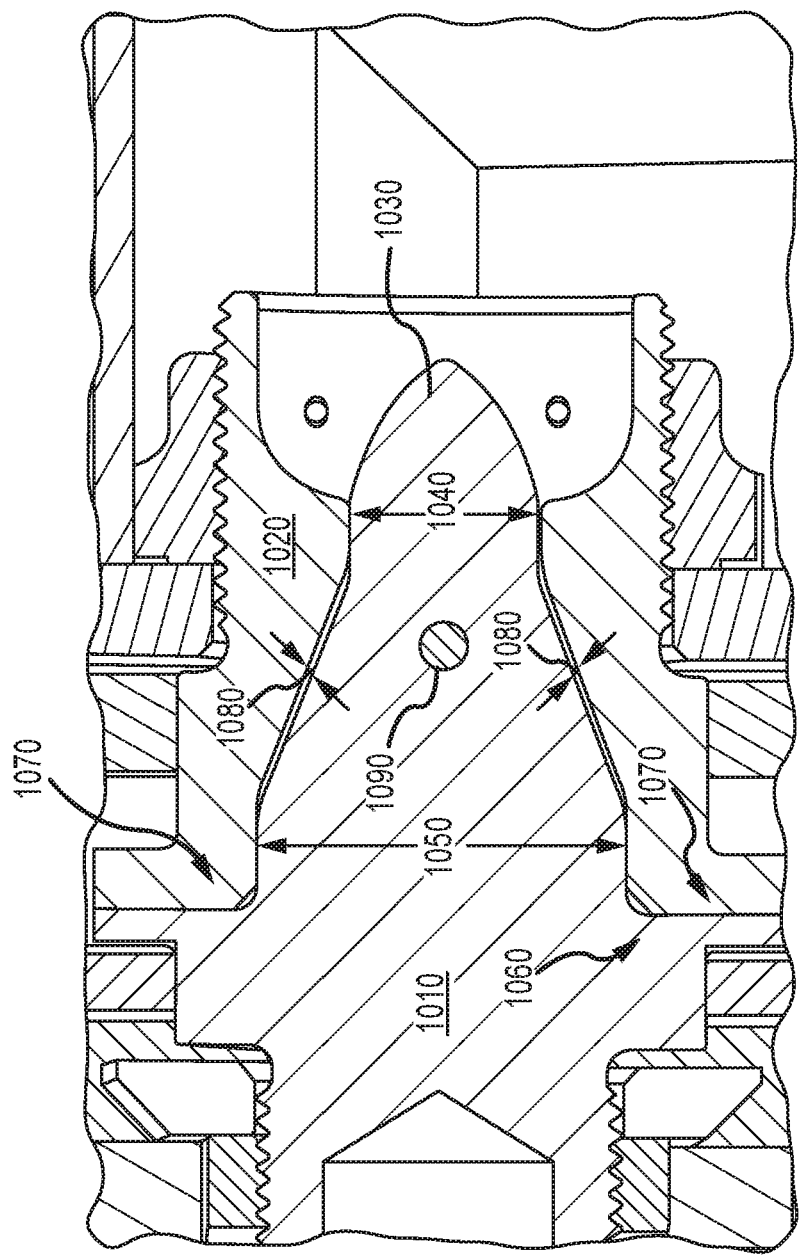
FIG. 10 is a side cut away view of a spar pin used in conjunction with one embodiment of a wing-fold mechanism of the present invention.

According to one embodiment of the present invention, each shear pin possesses a bullet like shape having two or more horizontal surfaces by which to transfer loads from the spar of the first wing section to the spar of the second wing section. FIG. 10 is a side, cut-away view of a shear pin within its shear pin socket according to one embodiment of the present invention. The shear pin 1010 shown in FIG. 10 includes a double taper design having a rounded, bullet nose 1030 at the distal end of the shear pin 1010 leading to a first load bearing section 1040 and thereafter to a second load bearing section 1050 wherein the second load bearing section 1050 possesses a larger diameter than the first load bearing section 1040. The socket 1020 is corresponding shaped to receive the shear pin 1010 such that upon complete insertion the shear pin skirt 1060 associated with the proximal end of the shear pin 1010 seats against the socket plate 1070 defining the outer most edge of the shear pin socket 1020.

As one of reasonable skill in the relevant art will appreciate, the shape of the shear pin shown in FIG. 10 and its associated socket make for a self-aligning system. As the extension alignment guide refines the alignment and mating of the first wing section to the second wing section, the shear pins need only be positioned so that the distal end 1030 of the shear pin 1010 be within the void or socket at the socket plate 1070. As the pin 1010 moves within the socket 1020 the tapered shape of the pin and socket guides pin into its proper position. While the pin depicted in FIG. 8 possesses two load-bearing surfaces other designs may have more or fewer such surfaces. Indeed the entire interaction between the socket and the pin is capable of carrying a portion of the shear load between the first wing section spar and the second wing section spar. However, as one skilled in the art will appreciate, a fully tapered design would produce a resultant lateral force driving the shear pin out of the socket. Thus the present design includes a void 1080 between the tapered walls of the socket/pin when the shear pin 1010 is in its proper position so as to minimize any force that may compromise the integrity of the juncture between the first wing section and the second wing section. Lastly, the shear pin includes a lateral void or hole 1090 traversing the width of the pin associated within the tapered section. As will be apparent with reference to FIG. 11 below, the void is receptive of a locking pin that secures the shear pin 1010 within the socket 1020 upon full insertion.

Figure 11:
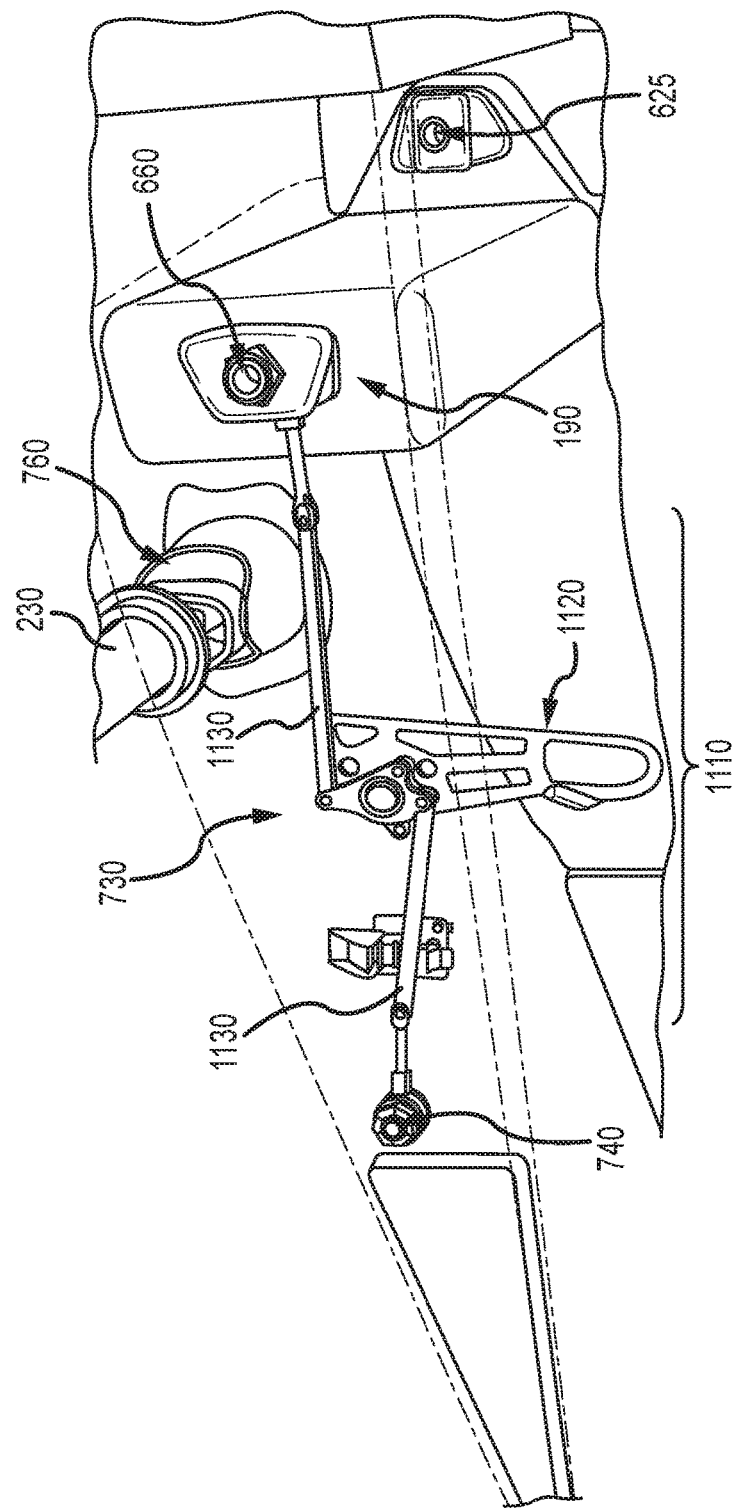
FIG. 11 is a front lower perspective drawing of the outboard surface of the inboard wing section and shear pin locking mechanism according to one embodiment of the present invention.

FIG. 11 is a front lower perspective drawing of the outboard surface of the inboard wing section and locking mechanism according to one embodiment of the present invention. The outboard surface or rib 730 of the second wing section 220 includes a locking mechanism 1110 that secures the second and third shear pins 655, 710 within their respective sockets 660, 740. The locking mechanism includes a rotatable handle 1120 coupled to two rods 1130 that each include a pin (not shown) that is positioned adjacent and traverse to the second and third sockets 660, 740 respectively. As the handle 1120 is rotated clockwise the rods 1130 extend the pins into and across the socket securing the pins 655, 710 within the socket.

As the first wing section 210 is joined with the second wing section 220 the shear pins 615, 655, 710 are aligned with and inserted into their respective sockets 625, 660, 740. In this embodiment of the present invention, the second shear pin 655 and the third shear pin 710 include a void or hole 1090 configured to accept the locking pin associated with the locking mechanism 1110. Once the shear pins 615, 655, 710 are firmly seated within their socket 625, 660, 740, the locking mechanism handle 1120 is rotated clockwise to extend the pins into the locking pin void 1090. As one of reasonable skill in the relevant art will recognize, aerodynamic forces experienced by the first wing section and transferred to the second wing section are substantially aligned with the vertical or yaw axis. Thus the vast majority of the force is a shear force conveyed by the shear pin. The first wing section experiences little force along the lateral or pitch axis and thus the locking pin needs only securely maintain the shear pin within the shear pin socket. One of reasonable skill in the relevant art will also recognize that other locking pin orientations and insertion mechanisms are possible without departing from the scope and intent of the present invention.

Figure 12:
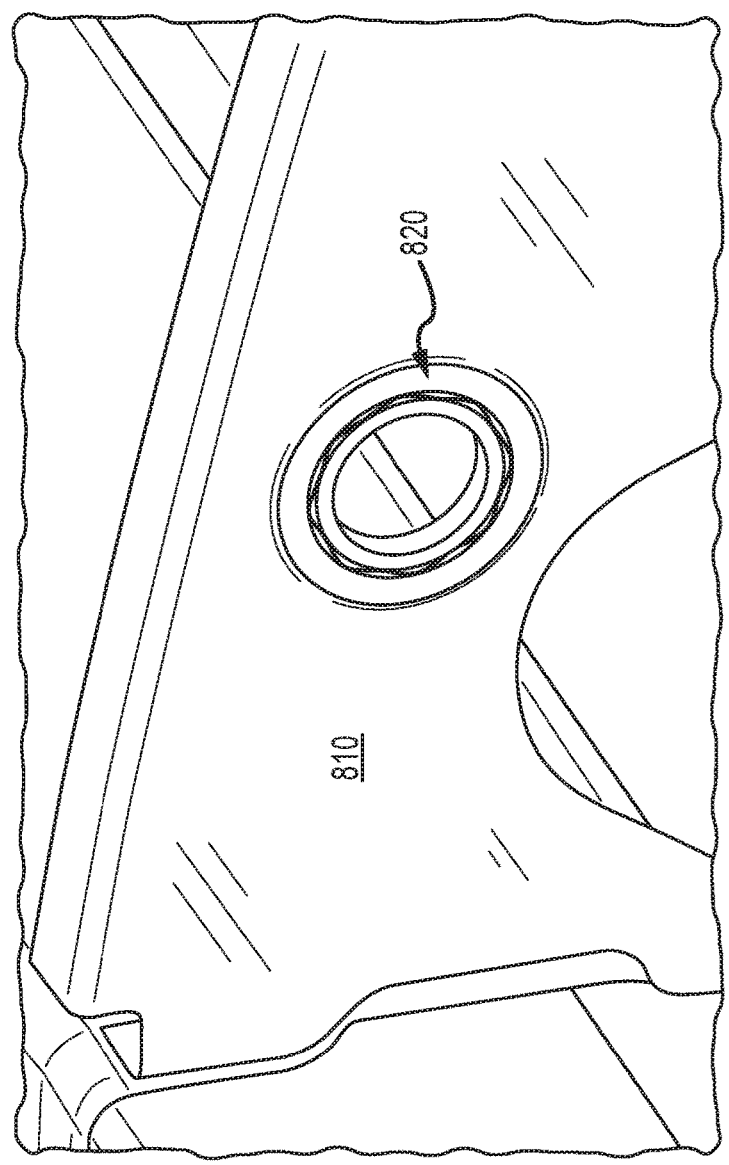
FIG. 12 is an perspective view of a wing rib and wing-fold mechanism floating guide according to one embodiment of the present invention.

Another feature of the present invention is the ability of the first wing section to be easily guided into the proper position so that the first wing section can be joined with the second wing section. As described above, the shape of the shear pins enables the two wing sections to come together slightly misaligned. As the shear pins enter their sockets the wings obtain their final alignment. To further assist in aligning the shear pins with the shear pin receptacles or sockets, a movable bearing or guide assembly 820 circumscribes the extension tube 230. FIG. 12 is a side perspective view of an interior rib of the first wing second 210 having a movable bearing according to one embodiment of the present invention. The bearing assembly 820 is positioned within a supporting rib 810 so as to accept the extension tube 230 coupling the first wing section 210 to the second wing section 220.

Figure 13:
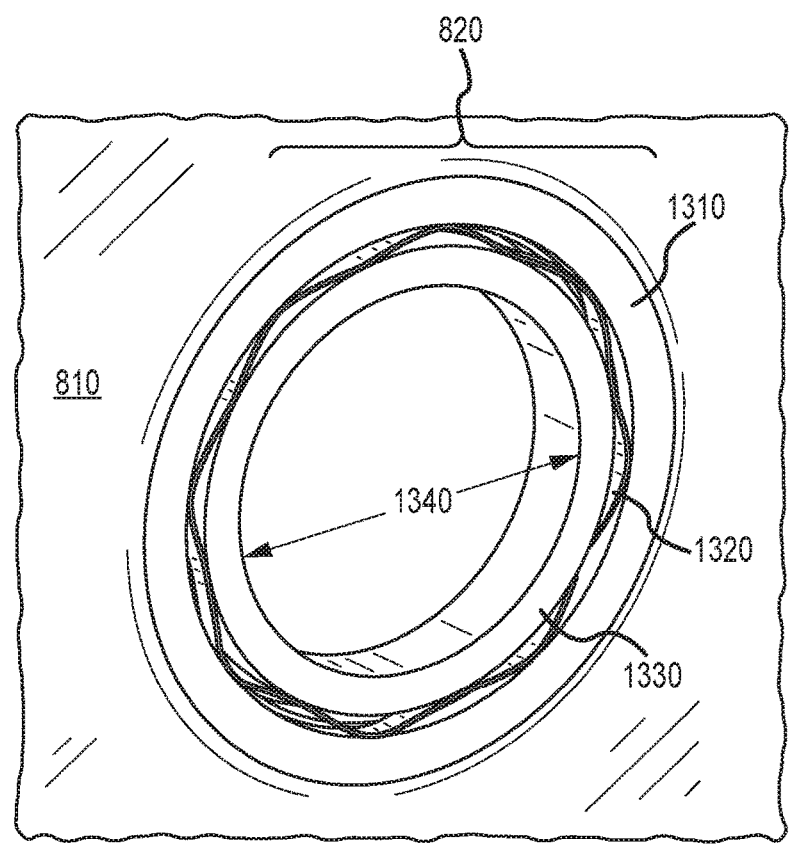
FIG. 13 is a detailed view of the wing-fold mechanism floating guide according to one embodiment of the present invention.

As can be seen in FIG. 13, the bearing assembly 820 includes an outer housing 1310 and an inner housing 1330. The interior diameter 1340 of the inner housing 1330 is large enough to accept the outer diameter of the extension tube 230. Interposed between the inner housing 1330 and the outer housing 1310 is a deformable spring 1320 that enable the inner housing 1330 and thus the extension tube 230, to be displace laterally with respect to the outer housing 1310. As the first wing section 210 is supported by the extension tube 230 in its extended state, the movable nature of the inner bearing 1330 enables the user to adjust and fine tune the position of the first wing section relative to the second wing section as the two are joined together.

Figure 14:
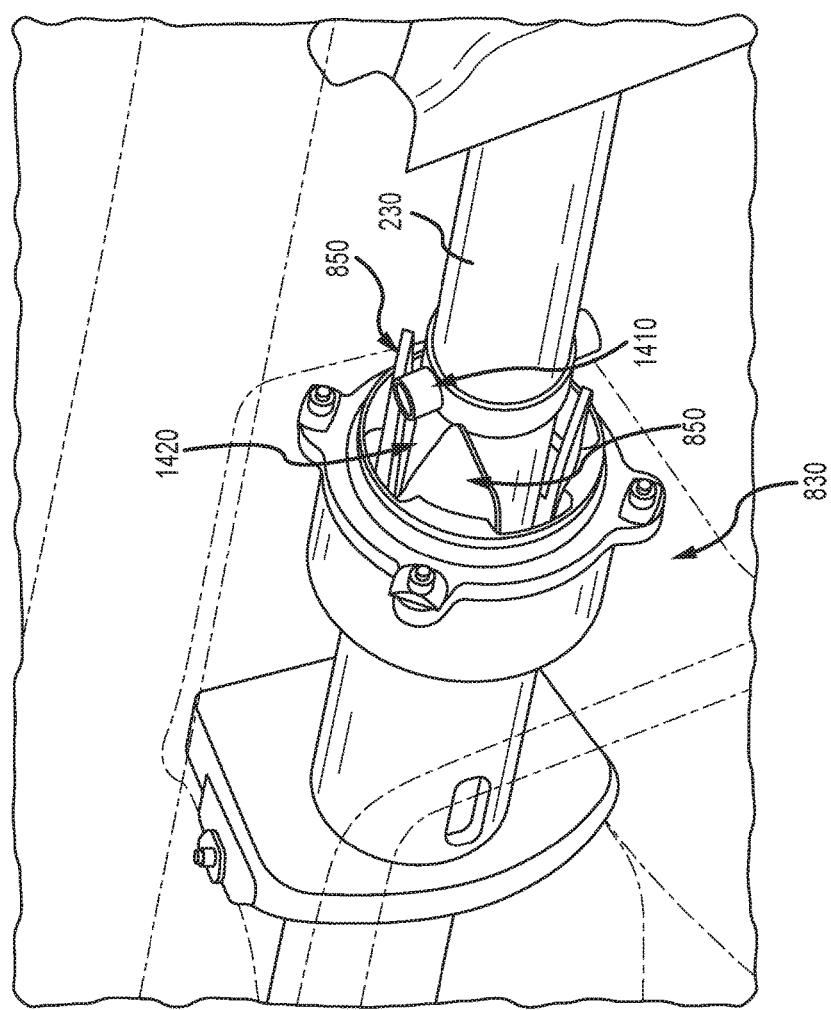
FIG. 14 is a front upper perspective view of a rotational guide for positioning the outboard wing for storage and juncture with the inboard wing section according to one embodiment of the present invention.

A further innovation of the present invention includes an alignment guide 850 that also assists in guiding the first wing section into proper alignment with the second wing section to achieve a flight configuration. FIG. 14 is a perspective view of an alignment guide for assisting in the joining of a first wing section to a second wing section according to one embodiment of the present invention. The alignment guide 850 includes a plurality of slots 1420 that are receptive of a pin 1410 affixed to the extension tube 230. As the first wing section and accompanying extension tube is collapsed from its fully extended state to its joining state, the extension tube traverses the extension tube housing 830 and alignment guide. As the first wing section approaches the second wing section, one or more pins 230 affixed to the extension tube 230 are captured by a narrowing slot 1420 within the alignment guided 850. As the pin 1410 engages and travels down the slot, the first wing section, which is affixed to the extension tube guide 830, is directed to a predefined position. This position as defined by the narrowest portion of the alignment guide 850 places the distal end of the shear pins within the shear pin socket. The aforementioned alignment guide 850 combined with the movable bearing 820 and the tapered shear pins 615, 655, 710 enable a user to manually place the first wing section into a flight configuration both efficiently and consistently.

The wing-fold mechanism of the present invention enables a user to manually disconnect, fold and stow the outboard (first) wing section apart from the inboard (second) wing section for storage and/or transportation. The mechanism described herein not only provides a means by which to efficiently fold and store the first wing section but also to reliably reconfigure the aircraft into its flight configuration.

Figure 15:
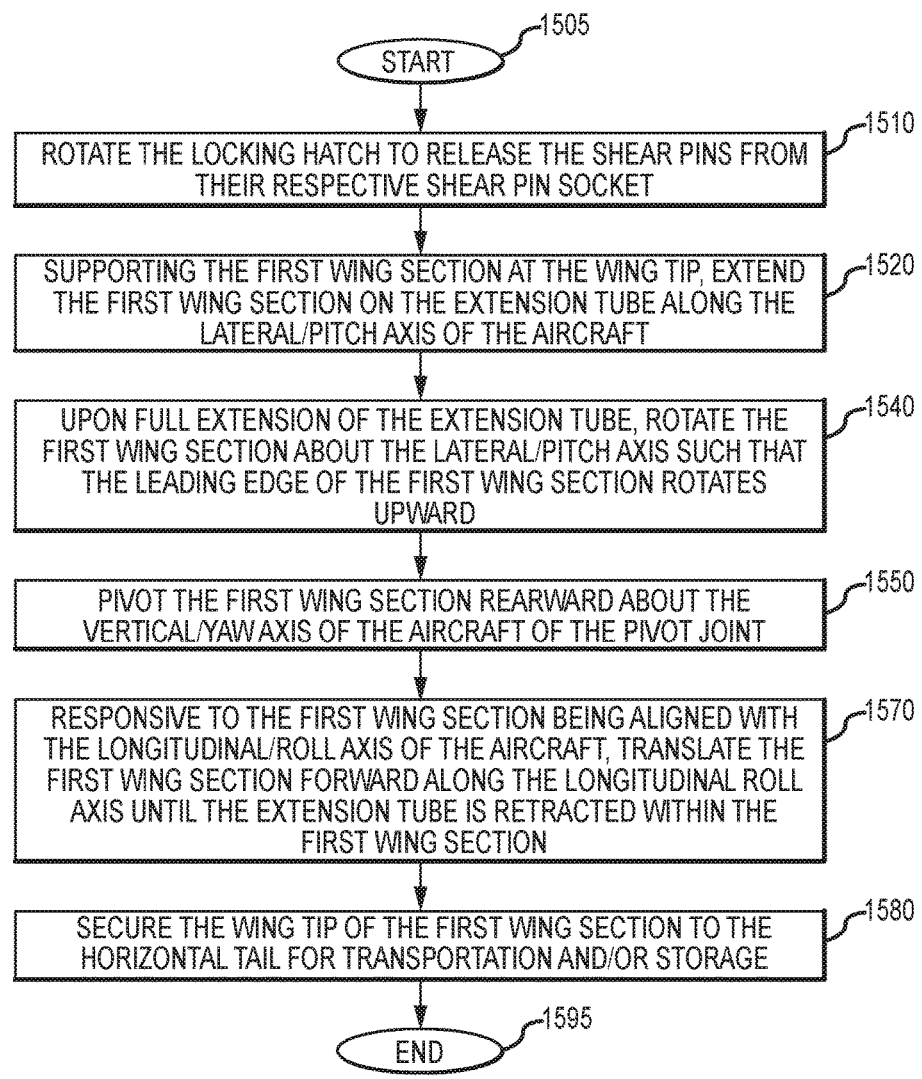
FIG. 15 is a flowchart of a methodology to fold and store a wing section using one embodiment of the wing-fold mechanism of the present invention.

FIG. 15 is a flowchart of one methodology for folding the first wing section of an aircraft to its stowed position using one embodiment of the wing-fold mechanism of the present invention. One of reasonable skill in the relevant art will appreciate that these steps are not all inclusive and that intermediate or a different approach using the wing-fold mechanism of the present invention may achieve similar or even identical results. Thus steps illustrated below may, in other embodiments, be combined or omitted and other steps in yet other embodiments may be included, all without departing from the scope and intent of the present invention.

The process by which a wing is folded and placed into a stowed or transportable condition begins 1505 with rotating the locking handle 1510 so as to release the shear pins from their respective sockets. Recall that in one embodiment, two shear pins are secured within their sockets by a pin that is attached to a rotatable rod and handle assembly. As the handle is rotated the locking pins are withdrawn enabling the shear pins to be withdrawn from their sockets.

With the pins placed into a retractable state, the first wing section is extended along the lateral axis 1520 from the second wing section. In most cases a user will support the first wing section at the wing tip and pull the first wing section away from the fuselage. As the shear pins slide out of their sockets the juncture between the first wing section and the second wing section begins to separate. While the user supports the weight of the wing at the wing tip, the remainder of the load is transferred to the extension tube as the shear pins are pulled from their sockets.

As the first wing section is extended away from the second wing section along the aircrafts lateral or pitch axis, the user supports the first wing section at the wingtip and the extension tube carries the remaining load at the pivot point adjacent to the second wing section. Once extended, the user rotates 1540 the first wing section about lateral/pitch axis so that the leading edge of the first wing section rotates upward. In other embodiments, the leading edge of the wing may be rotated downward. The first wing section is rotated approximately 90 degrees making the first wing section, although still aligned with the lateral axis of the aircraft, perpendicular to the second wing section.

Once rotated, the user pivots 1550 the first wing section rearward about the vertical or yaw axis bringing the wingtip of the first wing section toward the tail of the aircraft. At this point the first wing section is aligned with the longitudinal/roll axis of the aircraft.

Responsive to the first wing section being aligned with the longitudinal axis of the aircraft, the first wing section is translated 1570 forward along the aircraft's longitudinal axis. As the wing section moves toward the nose of the aircraft the first wing section receives the extension tube within the confines of the wing. As the wing translates forward the guide pins associated with the extension tube are accepted within a narrowing slot of the alignment guide. In such a manner the interaction between the alignment guide and the guide pins assist in securing the first wing section from rotating about the extension tube (longitudinal axis in this orientation) and/or pivot joint during transportation and storage.

With the wing fully translated forward and aligned with the longitudinal axis of the aircraft, the wingtip of the folded first wing section is secured 1580 to the tail or empennage of the aircraft completing the stowing process 1595.

Figure 16:
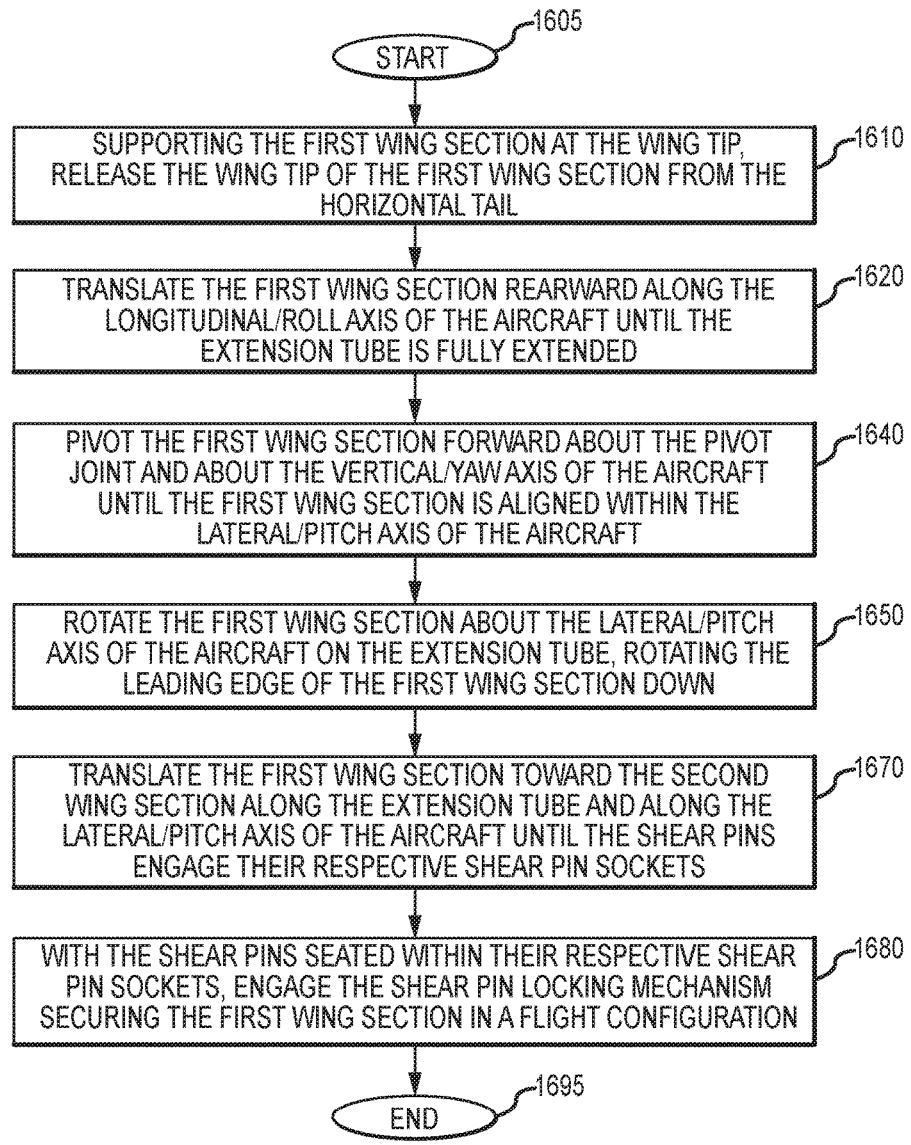
FIG. 16 is a flowchart of a methodology to unfold and place a wing section into its flight configuration using one embodiment of the wing-fold mechanism of the present invention.

The reconfiguration of the aircraft wing reverses the steps outlined above and are illustrated in the flowchart depicted in FIG. 16. The reconfiguration process begins 1605 with unlatching or releasing 1610 the folded wingtip from the tail or empennage of the aircraft. Once free of the tail, the first wing section is supported by a user at the wingtip and the extension tube near the juncture. Supporting the wingtip, the user translates 1620 the first wing section rearward, away from the nose of the aircraft and along the longitudinal axis of the aircraft.

Once the extension tube is fully extended the guide pins associated with the extension tube no longer interact with the slots of the alignment guide. Thus in this position the wing cannot only pivot forward about the pivot joint, but also rotate about the extension tube. However, to prevent interaction between the wing and the fuselage the wing is maintained in its vertical orientation until the first and second wing sections are aligned along the lateral axis.

Accordingly, the next step in the reconfiguration process includes pivoting 1640 the first wing section about the vertical/yaw axis of the aircraft at the pivot point. The first wing section is pivoted forward so as to be aligned with the lateral/pitch axis of the aircraft. In this position the wing is then rotated 1650 about the lateral axis bringing the leading edge down so as to be aligned with the leading edge of the second wing section.

Holding the wingtip, the first wing section is then pushed (translated) 1670 toward the second wing section along the lateral axis. As the extension tube is once again received within the first wing section the alignment pin associated with the extension tube interacts with the alignment guide. The narrowing slots in the alignment guide assist in placing the first wing section into proper alignment with the second wing so that the shear pins of the first wing section can be engaged by the shear pin sockets of the second wing section.

As the first wing is guided into position by the narrowing slots of the alignment guide, minor adjustments in the position of the first wing section are possible by virtue of a movable bearing that enables the movement of the extension tube in the plane defined by the yaw and roll axis of the aircraft. This flexibility, along with the alignment guide, enables the placement of enables the tips of shear pins within their respective shear pin sockets. As the shear pins possess, in one embodiment of the present invention, a multi-tapered configuration, they too assist in guiding the first wing section into proper alignment with respect to the second wing section.

Once the shear pins of the first wing section are seated within the shear pin sockets associated with the second wing section, the shear pin locking pins can be inserted into the shear pins by engaging 1680 the shear pin locking mechanism. Having the locking pins inserted into the shear pins secures the first wing section to the second wing section in a flight configuration 1695.

The manual wing-fold mechanism of the present invention provides a means by which to reconfigure the wing of an aircraft from a flight configuration to one that can be easily stowed and transported. The folding mechanism is comprised primarily of an extension tube that enables the outboard portion of the wing to be extended away from the inboard section, rotated about the lateral axis of the aircraft and thereafter pivoted rearward so that the wing is aligned with the longitudinal axis of the aircraft along side the fuselage.

The wing-fold mechanism of the present invention is independent of the structural components of the wing used to convey aerodynamic loads during flight. That is to say, the wing spar(s) is (are) not involved with supporting the outboard wing section as it is extended, rotated, and folded back into its stowed position. The manual wing-fold mechanism of the present invention also provides for the user to bring the first wing section into a near alignment position while the wing-fold mechanism thereafter assists to refine the alignment into is final configuration. The alignment and shape of the shear pins is one feature of the present invention that enables this sort of final refining process. By coupling the wing spar of the first wing section with the spar of the second wing section using shear pins that are also aligned with the lateral axis of the aircraft (aligned with the spars), the juncture of the first wing section to the second wing section mandates proper seating of the shear pins within their sockets. A secondary step of inserting shear pins within the joining spars is not necessary thus simplifying the process and making the juncture more reliable.

The manual wing-fold mechanism of the present invention is simple, efficient, reliable and durable. It enables a single individual to release and stow each wing of the aircraft to a storable/transportable configuration as well as reconfigure the aircraft into its flight configuration.

While the invention has been particularly shown and described with reference to embodiments, it will be understood by those skilled in the art that various other changes in the form and details may be made without departing from the spirit and scope of the invention. It should also be understood that this description has been made by way of example, and that the invention is defined by the scope of the claims that follow this description.

As will be further understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented in different forms without departing from the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel features or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A wing-fold apparatus for folding a wing, the wing having a wingtip and a wing root, of an aircraft, comprising:
   an extension tube, coupled to an inboard section of the wing and to an outboard section of the wing, and wherein the extension tube is aligned with a lateral axis of the aircraft when the aircraft is configured for flight, the lateral axis spanning through the wingtip and the wing root of the wing;
   a pivot point located at a juncture between the extension tube and the inboard wing section; and
   an alignment guide wherein the alignment guide includes a narrowing slot that interacts with a pin affixed to the extension tube as the wing is placed in a flight configuration, and responsive to the pin interacting with the narrowing slot, a plurality of shear pins parallel with the lateral axis and affixed to a wing spar each interact with a corresponding receptacle to join a outboard wing section spar with a inboard wing section spar, and wherein the extension tube is independent of the inboard wing section spar and independent of the outboard wing section spar.

2. The wing-fold apparatus of claim 1, wherein the extension tube is rotatable about the lateral axis.

3. The wing-fold apparatus of claim 1, wherein extension tube extendable along the lateral axis.

4. The wing-fold apparatus of claim 1, wherein responsive to the extension tube extending along the lateral axis, the extension tube is configured to rotate the outboard wing section about the lateral axis.

5. The wing-fold apparatus of claim 1, wherein the pivot point pivots the outboard wing section about a vertical axis perpendicular to the lateral axis placing the outboard wing section substantially perpendicular to the inboard wing section.

6. The wing-fold apparatus of claim 1, wherein transfer of aerodynamic loads is independent of the extension tube.

7. The wing-fold apparatus of claim 1, wherein the plurality of shear pins transfer in-flight aerodynamic loads from the outboard wing section to the inboard wing section.

8. The wing-fold apparatus of claim 1, wherein each of the plurality of shear pins are associated with the outboard wing section.

9. The wing-fold apparatus of claim 1, wherein each corresponding receptacle is associated with the inboard wing section.

10. The wing-fold apparatus of claim 1, wherein each of the plurality of shear pins are secured in the corresponding receptacle by a transverse lock pin.

11. A method for folding a wing of an aircraft, the wing having a wingtip and a wing root, the method comprising:

withdrawing a traverse lock pin from each shear pin;

extending an extension tube thereby translating an outboard wing section along a lateral axis away from an inboard wing section, wherein the extension tube is coupled to the inboard section of the wing and to the outboard section of the wing independent of an outboard wing section spar and independent of an inboard wing section spar, and wherein the extension tube is aligned with the lateral, the lateral axis spanning through the wingtip and the wing root of the wing;

rotating the outboard wing section about the lateral axis to place the outboard wing section perpendicular with the inboard wing section;

pivoting the outboard wing section rearward about a pivot point located at a juncture between the extension tube and the inboard wing section; and aligning the outboard wing section with a fuselage of the aircraft.

12. The method for folding a wing of an aircraft according to claim 11, wherein extending the extension tube disengages a plurality of shear pins coupling an outboard wing section spar to an inboard wing section spar.

13. The method for folding a wing of an aircraft according to claim 11, wherein the outboard wing section is rotated approximately 90 degrees.

14. The method for folding a wing of an aircraft according to claim 11, wherein responsive to the wing being placed in a flight configuration, the plurality of shear pings are aligned with lateral axis.

15. The method for folding a wing of an aircraft according to claim 14, wherein in the flight configuration a portion of the outboard wing spar overlaps a portion of the inboard wing section spar.

16. The method for folding a wing of an aircraft according to claim 11, wherein the extension tube is independent of aerodynamic loads transferred between the outboard wing spar and the inboard wing spar.

17. The method for folding a wing of an aircraft according to claim 11, wherein the outboard wing section includes a floating bearing circumscribing the extension tube and wherein the floating bearing displaces the outboard wing section perpendicularly to the lateral axis and about the extension tube.

* * * * *